United States Patent [19]

Lamiaux et al.

[11] Patent Number: 4,715,016
[45] Date of Patent: Dec. 22, 1987

[54] MEMORY SAFEGUARD DEVICE FOR MICROPROCESSOR

[75] Inventors: Sylves Lamiaux, Yerville; Alex Kuhn, Pontoise, both of France

[73] Assignee: Societe d'Applications Generales d'Electricite et de Mecanique (SAGEM), Paris, France

[21] Appl. No.: 784,773

[22] Filed: Oct. 7, 1985

[30] Foreign Application Priority Data

Oct. 15, 1984 [FR] France ................. 8415759

[51] Int. Cl.⁴ ............................. G11C 11/40
[52] U.S. Cl. ................... 365/229; 365/228
[58] Field of Search ............ 365/229, 226, 228; 364/200 MS File, 900 MS File; 307/66, 200 A

[56] References Cited

U.S. PATENT DOCUMENTS

| | | | |
|---|---|---|---|
| 3,978,457 | 8/1976 | Check, Jr. et al. | 364/200 |
| 3,980,935 | 9/1976 | Worst | 365/229 |
| 4,145,761 | 3/1979 | Gunter et al. | 365/227 |
| 4,148,099 | 4/1979 | Lauffer et al. | 364/226 |
| 4,288,865 | 9/1981 | Graham | 365/229 |
| 4,421,977 | 12/1983 | Kittredge | 235/101 |
| 4,451,742 | 5/1984 | Aswell | 307/66 |
| 4,461,003 | 7/1984 | Tamaki | 371/66 |
| 4,463,446 | 7/1984 | Shah et al. | 364/900 |
| 4,464,584 | 8/1984 | Hentzschel et al. | 307/200 A |
| 4,489,394 | 12/1984 | Borg | 364/900 |

FOREIGN PATENT DOCUMENTS 0027432 4/1921 European Pat. Off. .

Primary Examiner—Gary V. Harkcom
Assistant Examiner—Randy W. Lacasse
Attorney, Agent, or Firm—Stevens, Davis, Miller & Mosher

[57] ABSTRACT

A microprocessor memory safeguard device comprising a switch having two input terminals and a common terminal. The common terminal is connected to a first terminal of the memory and to the logic zero of the microprocessor. The other input terminal of the switch is connected to one terminal of a battery. The second terminal of the memory is connected to the other terminal of the battery. The second input terminal of the switch is connected to an initialization line of the processor whose initialization input is also connected to the line. The initialization line is connected directly to a power supply source. The initialization line could also be a data bus interconnecting a plurality of microprocessors.

3 Claims, 6 Drawing Figures

MEMORY SAFEGUARD DEVICE FOR MICROPROCESSOR

BACKGROUND OF THE INVENTION

The present invention relates to a microprocessor memory safeguard device, particularly for a teleprinter microprocessor, comprising a safeguard battery and means adapted for connecting the terminals of the battery to the terminals of the memory.

During a drop in voltage of a microprocessor power supply or during an unexpected interruption of the power supply source, microprocessors cease to execute their programs but their memories must generally be safeguarded until they return to their initial state, when the supply voltage rises again. Safeguard batteries, connected to their memories, provide this function.

Moreover, for safety and specification reasons, the safeguard batteries must be disconnected from their memories during transport of the microprocessors.

As a result, conventionally a safeguard battery was connected to its memory by a switch which is actuated after transport for providing the connection.

Furthermore, during "unbuckling" of a microprocessor, i.e. when it is no longer operating, without being necessarily totally inoperative, it was necessary to reinitialize it or to provide a so-called guard dog function by connecting, by means of a button, its initialization input to an initialization line itself connected to the initialization output of the power supply source.

In short, prior to the present invention, a switch button and an initialization button were necessary.

SUMMARY OF THE INVENTION

An object of the present invention is to simplify the implementation of the battery safeguard function as well as to reduce the number of parts required for providing the battery safeguard and guard dog functions.

To achieve this object, the present invention provides a microprocessor memory safeguard device comprising a safeguard battery and means adapted for connecting the terminals of the battery to the terminals of the memory, wherein said connection means comprise a switch with two input terminals and a common terminal connected to one of the two terminals of the memory and to the logic zero of the microprocessor, one of the two input terminals of the switch being connected to one of the two terminals of the battery, the other terminal of the memory being connected to the other terminal of the battery, and the other of the two input terminals of the switch being connected to an initialization line of the microprocessor.

Thus, with the invention, during transport it is sufficient to place the switch in the position connecting the memory with the initialization line. Thus, the memory is no longer connected to the two terminals of the battery; if then, when the microprocessor is to resume operation, the user forgets to change the switch back to the memory safeguard position. the microprocessor even under voltage, is permanently reinitialized. Furthermore, if during operation, with the switch in the memory safeguard position, the microprocessor is unbuckled, (i.e., no longer operating), it is sufficient to change the position of a single switch for reinitializing the processor before again switching over the switch so as to place it back in the memory safeguard position.

In a particular embodiment of the device of the invention, the initialization line is connected directly to the initialization output of a power supply source.

In the preferred embodiment of the device of the invention, the initialization line is a series data bus interconnecting a plurality of microprocessors, to which the initialization output of at least one power supply source is connected.

BRIEF DESCRIPTION OF THE DRAWINGS

The invention will be better understood from the following description of several embodiments of the device of the invention with reference to the accompanying drawings in which.

DESCRIPTION OF THE PREFERRED EMBODIMENTS

Figure 1:
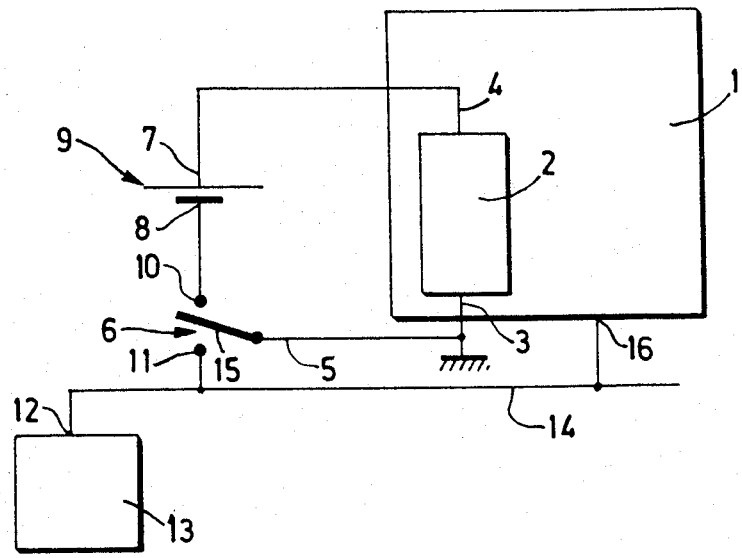
FIG. 1 shows a schematic view of a first embodiment of the device of the invention.
Figure 2:
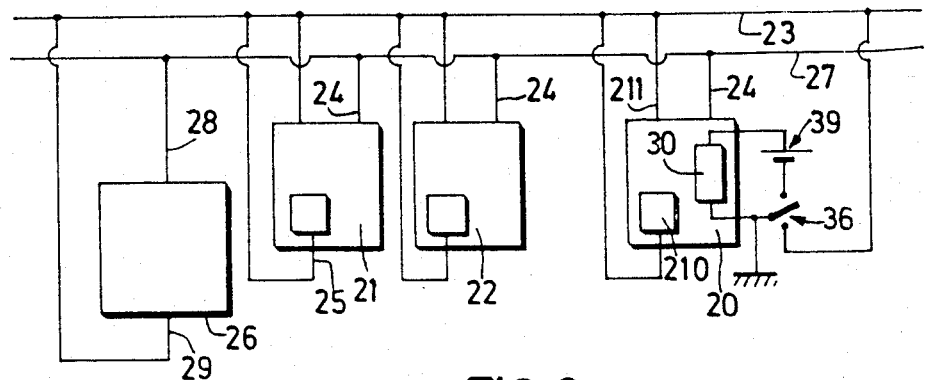
FIG. 2 shows a schematic view of a second embodiment of the device of the invention, integrated in a system of microprocessors interconnected by a data bus.
Figure 3:
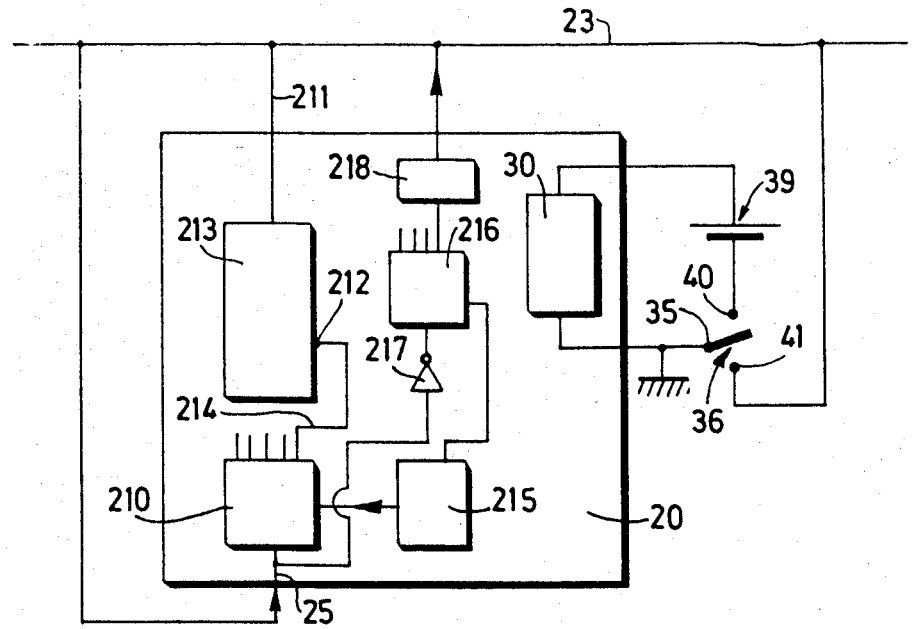
FIG. 3 shows in greater detail one of the microprocessors of the system of FIG. 2.

Assuming, with reference to FIG. 1, a microprocessor 1, for example that of a system of microprocessors of a teleprinter, comprising more especially at least one memory 2, with two terminals 3, 4, terminal 3 being connected to the logic zero of the apparatus.

Through its terminal 3, memory 2 is connected to the common terminal 5 of a switch 6, and by its terminal 4 it is connected to one of the two terminals 7, 8, in this case the positive terminal 7, of a battery 9. Terminal 8 of battery 9 is connected to terminal 10 of the two input terminals of switch 6, whose other input terminal 11 is connected to a line 14 for initializing the microprocessor 1, which line is itself connected to the initialization output 12 of a power supply source 13, as well as to the initialization input 16 of the microprocessor. The mobile contact 15 of switch 6 may connect the common terminal 5 and hence memory terminal 3 to (1) terminal 10 and and in turn to terminal 8 of battery 9, or (2) terminal 11 and in turn to the initialization line 14, which thus connects the initialization line 14 of the microprocessor 1 to the logic zero.

In the transport position, the mobile contact 15 of switch 6 is engaged with terminal 11.

In the operating position, the mobile contact 15 is engaged with terminal 10.

If, after transport, the operator forgets to change the position of the switch back to the memory safeguard position, not only is memory 2 is not connected to the safeguard battery but microprocessor 1 is permanently reinitialized.

In the case of unbuckling, i.e., with the microprocessor no longer operating, the microprocessor is reinitialized by means of connections 16, 14, 11, 15 and 5, after switching of switch 6 to the position connecting the microprocessor with initialization line 14.

In the embodiment shown in FIGS,. 2 and 3, microprocessor 20 belongs to a system of microprocessors 20, 21, 22, interconnected by a series data bus 23. Each of the microprocessors is provided with a power supply input 24 and an initialization input 25. A voltage source 26, here the only one, is provided for supplying microprocessors with power, in the case considered at 5 volts, through a power supply output 28 and a power supply line 27 to which they are connected by their inputs 24.

Through an initialization output 29, source 28 is connected to bus 23 to which the microprocessors are functionally connected by their initialization inputs 25. These initialization inputs 25 are connected to respective initialization counters 210.

Figure 4:
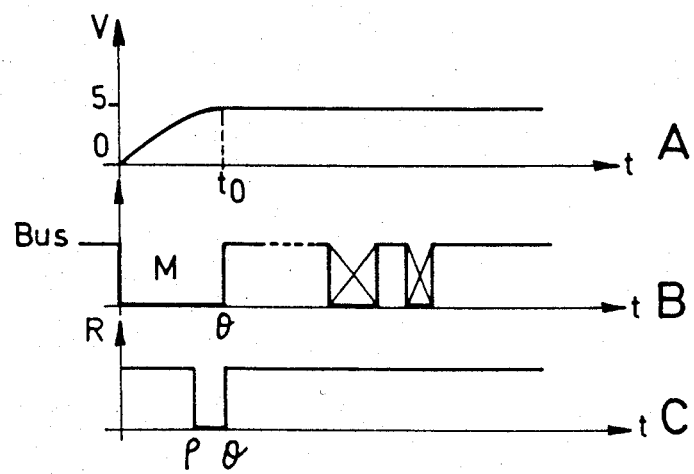
FIGS. 4a, 4b, 4c show respectively the timing diagrams of the supply voltage, of the data bus signal and of the signal initializing the microprocessors of the system of FIG. 2.

During the rise (t, t+to) of the supply voltage V (FIG. 4) which may happen not only during start up of the system but after a drop or unexpected interruption of the voltage, bus 23 must remain in the "stop" condition, here in the low state, so that the microprocessors which are coupled thereto do not execute their programs. For this, source 26 emits through line 29 a signal M for holding bus 23 at 0, which signal is in the form of a square wave of a duration $\theta$. Reception of the holding signal M by initialization counters 210, at inputs 25 which are, in fact, the count enabling inputs of counters 210, causes, at a "reset" terminal 212 of the active part 213 of the microprocessors, i.e. the true initialization terminal, but only after a duration $\rho$ equal to the longest of the character frames likely to flow over bus 23, a pulse of duration $\nu$ equal to $\sigma-\rho$ which will truly initialize the microprocessors.

To provide the function of recognition of the initialization signal, each microprocessor comprises an active data processing part 213, a counter 210 and a clock 215. In actual fact, connection 211 between the microprocessor and bus 23 represents not only the connection between the emitter (not shown) of the microprocessor and the bus 23, but also the connection between the receiver (not shown) of the microprocessor and bus 23. Counter 210 receives at its two inputs the connection 25 and the output of clock 215. The reset terminal 212 of the part 213 of the microprocessor is connected to one of the outputs of counter 210, the one 214 whose binary weight corresponds to a duration at least equal to $\rho$.

For providing the guard dog function each microprocessor further comprises a second counter 216 connected by its inputs to clock 215 and to an inverter 217, itself connected by its input to said initialization input 25 and the output of counter 216, whose binary weight corresponds to a predetermined duration $\eta$ at least equal to the maximum duration between two frames, is connected to the input of a monostable 218 whose output is connected to bus 23. Counter 216 and monostable 218 form, in the example considered, an initialization signal generator.

When, after "unbuckling", bus 23 has remained in its state for at least this duration $\eta$, counter 216, through monostable 218, resets bus 23 to its other state, here the low state: we are then brought back to the preceding problem. It is counter 210 which will then provide initialization following the recognition effected as before.

The microprocessor 20, to consider only that one, comprises more especially a memory 30 connected, as memory 2 of the microprocessor 1 of FIG. 1, to a battery 39 through a switch 36 having two input terminals 40, 41 and a common terminal 35; terminal 35 is connected to one of the terminals of memory 30, as well as to the logic zero of the apparatus, terminal 40 is connected to one of the terminals of battery 39 and terminal 41 is connected to the data bus 23.

In the transport position, the mobile contact of switch 36 is engaged with terminal 41. In the operating position, the mobile contact is engaged with terminal 40.

The operation is here the same as described above.

What is claimed is:

1. A microprocessor memory safeguard device, comprising:
    a safeguard battery having a pair of terminals; and
    connection means for connecting said terminals to terminals of a microprocessor memory, said connection means comprising a switching means with (i) a first input terminal, (ii) a second input terminal and (iii) a common terminal adapted to be connected to (i) one of said terminals of said microprocessor memory and (ii) a logic zero input of said microprocessor, one of said first input terminal and said second input terminal of said switching means being connected to one of said terminals of said battery, the other of said terminals of said battery being adapted to be connected to another terminal of said microprocessor memory, the other of said first input terminal and said second input terminal of said switching means being adapted to be connected to an initialization line for initializing said microprocessor, and said common terminal being engageable with said other of said first input terminal and said second input terminal of said switching means to engage said switching means with said initialization line.

2. The device as in claim 1, wherein said initialization line is connected to an initialization output of a power source.

3. The device as in claim 1, wherein said initialization line is a series data bus adapted to interconnect a plurality of microprocessors, and further comprising at least one power source having an initialization output connected to said series data bus.

* * * * *